United States Patent [19]
Gaddi

[11] Patent Number: 4,799,567
[45] Date of Patent: Jan. 24, 1989

[54] FRAME MOPED

[76] Inventor: Bruno Gaddi, Viale Giovanni Pisano, 60, 56100 Pisa, Italy

[21] Appl. No.: 109,765

[22] Filed: Oct. 19, 1987

[30] Foreign Application Priority Data

Oct. 24, 1986 [IT] Italy .............................. 23480/86[U]

[51] Int. Cl.$^4$ .............................................. B62K 11/00
[52] U.S. Cl. ................................... 180/205; 180/207; 180/219; 180/225
[58] Field of Search ............... 180/219, 205, 206, 207, 180/225; 280/281 R

[56] References Cited

U.S. PATENT DOCUMENTS

| | | | |
|---|---|---|---|
| 1,371,783 | 3/1921 | Goudard et al. | 180/225 |
| 2,545,142 | 3/1951 | Falchetto | 280/281 |
| 4,169,512 | 10/1979 | Ishikawa et al. | 180/205 |
| 4,715,465 | 12/1987 | Takahashi | 180/219 |

Primary Examiner—David M. Mitchell
Assistant Examiner—Donn McGiehan
Attorney, Agent, or Firm—Shlesinger, Fitzsimmons and Shlesinger

[57] ABSTRACT

A moped comprises a beam-type frame having a substantially horizontal central portion, to one end of which there is connected a front portion that carries the articulation of the front-wheel fork, and the other end of which extends to become an upwards-slanting rectilinear portion carrying at its end the support elements for the saddle and the rear mudguard. Said central portion is adapted, as a result of its width and length, to constitute a footrest, and said extended end, as a result of its dimensions and slanting upwards at an angle of less than 45°, is adapted to consitute a luggage carrier or a second footrest.

7 Claims, 3 Drawing Sheets

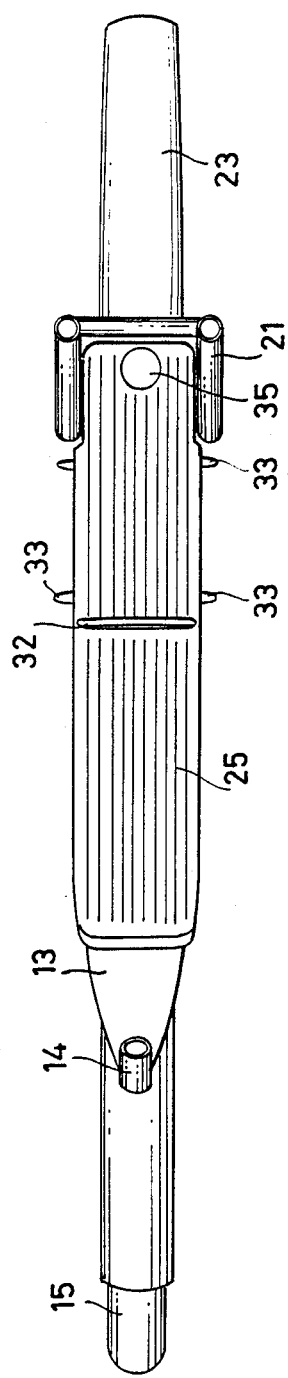
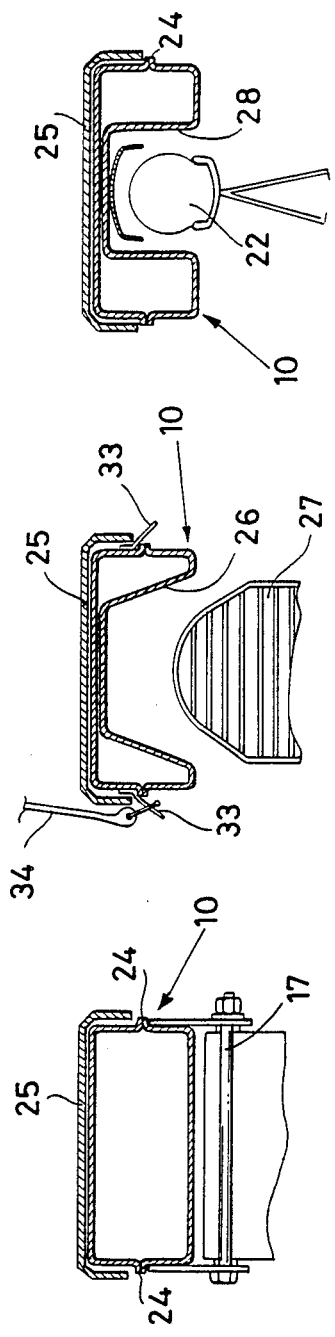

FRAME MOPED

The present invention relates to improvements to the frames of motorcycles, particulary mopeds. Two aspects of such frames are affected by the invention, which provides an integrated solution for them.

The first of these aspects concerns the luggage carrier. As all moped users and motorcycle users in general know, the fact that the standard-equipment luggage carrier is always positioned behind the saddle, and thus out of continuous view, makes it impossible for the cyclist to check that the objects contained in the carrier remain stably anchored, and that this often causes unease and worry in the cyclist or motorcyclist. It would be desirable for the luggage carrier to be able to be placed in a sufficiently visible position, provided this does not negatively affect the driving of the vehicle. It is for example wholly incorrect to anchor it to the steering assembly (handlebars or front fork) inasmuch as the weight of the luggage, even though limited, affects driving conditions.

The second of the said aspects is the increasing importance taken on by the small footboard/s on which the feet can be rested when the cyclist in not pedalling (and also on fixed footrests, as are adopted on nearly all mopeds, except the so-called "sports" types). The utility of the characteristic in question and the resulting market demand for it are due to the fact that in the position mentioned the cyclist is better protected against bad weather; in this regard it is far better to have a single footboard allowing the feet to be kept together than two small, separate footboards on the sides of the frame. Both solutions exist on the market, but not a single footboard of sufficient width and lenght at a limited height off the ground.

According to the invention, the characteristics mentioned at the outset as being desirable are obtained by embodying a moped in which a beam-type frame features a central portion having substantially horizontal development, and of the correct width, at one end of which there is connected a front portion that carries the articulation of the front-wheel fork and the other end of which the said central portion extends to become an upward-slanting portion (the slant angle being as small as possible) which continues to below the centre of the saddle. The upper surface of the horizontally developing portion of the frame acts as a footboard, while the analogue of the slanted portion acts as a luggage carrier, being integrated by suitable containing and securing elements. The luggage thus has a very baricentric and low position, which enhances stability and also means that it can be controlled visually and also manually from the cycling position. The luggage carrier thus positioned inside the external bulk of vehicle also lends itself well to acting as a support surface for the cyclist's crash-helmet when the vehicle is parked. Around the area occupied by the crash-helmet, the presence of the saddle and its supports can assist in defining elements for anchoring the crash-helmet to the vehicle.

The upper surface of the slanted portion of the frame can further be used as an alternative footrest, allowing lady-cyclists to ride in the position they normally adopt when they are wearing a skirt and are seated FIG. 7).

Manufacturers will find it in their commercial interest to considerusing this surface as luggage carrier (rational solution) or as a second footrest (clearly of not negligible commercial importance).

In order to better clarify the characteristics of the invention, and its advantages, one form of embodiment thereof is described and illustrated below. In addition, to show that the invention offers a clear and straightforward solution to a series of requisites (see below) that all mopeds of the non "sports" type should possess (but not to be found united in any known vehicle of such kind), the description and the drawings are referred to a complete moped structural arrangement, made possible by the type of frame in question. The said requisites are:

ease of dismounting from the frame in its central area; thus a maximum height of 35–37 cm;

correct height use positioning of the pedal axes (if pedals are present), since if too low they are dangerous and if too high inconvenient and also correct longitudinal positioning of the pedal axes (several centimetres further forward from the narrow end of the saddle, as in bycicles proper);

possibility of elastic rear suspension, which makes it more difficult to keep to the aforesaid 35–37 cm in that these values are desirable with the vehicle unloaded;

appropriate arrangement of other important members, such as the engine and fuel tank.

The description is given with reference to the appended 7 drawings:

FIGS. 1 and 2 are general views, elevation and plan respectively, of a vehicle featuring the improved frame according to the invention;

FIG. 3, 4 and 5 are sections taken through the lines III—III, IV—IV and V—V shown in FIG. 1;

Figure 1:
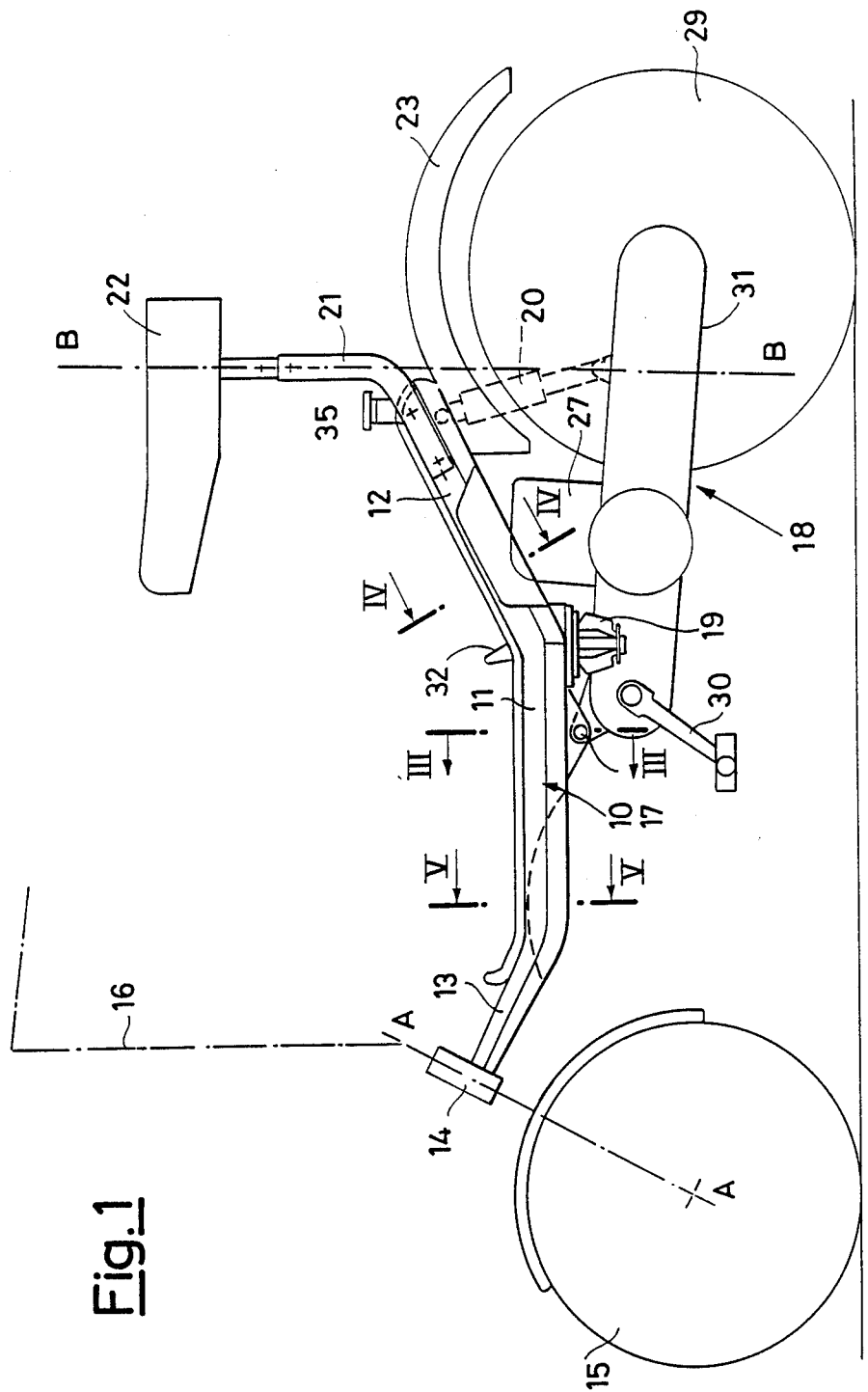
Figure 6:
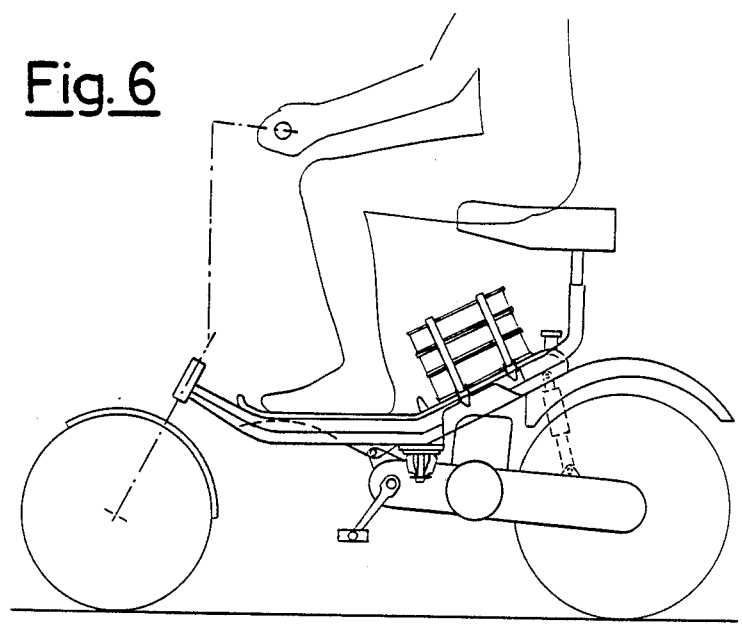
FIG. 6 is similar to FIG. 1, but with the addition of the drawn-in outline of the cyclist with feet resting on the footrest and of the bulk of a load of books on the luggage carrier.
Figure 7:
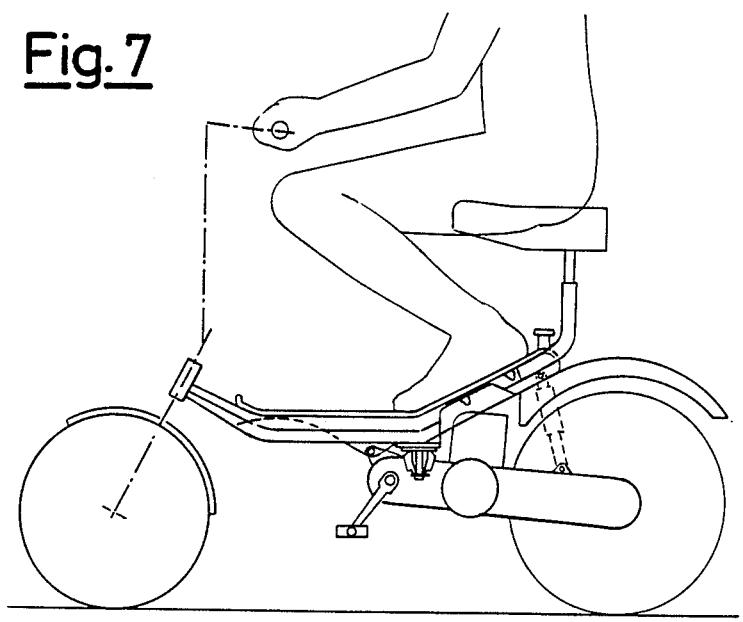
FIG. 7 is similar to FIG. 6, with the cyclist resting his/her feet on the slanted section of the frame.

As it appears from the drawings, the moped comprises a frame indicated overall by 10, which extends from the axis A—A of the steering to the vertical B—B of the centre of the saddle. The frame can be tubular, overlaid with plastic parts or, more conveniently, can be made of sheet material, as illustrated hereinafter, but in any case with a generally rectilinear overall section the height of which is less than the width. The frame features a substantially horizontal central portion 1 which extends diagonally upwardly at an angle of less than 45° to the horizontal, and thereby to become an upwards-slanting rear portion 12 having a generally plane upper surface approximately equal in size to that of the upper surface of central portion 11 of the frame. At its front end the part 11 features a short part 13 connecting to the hub 14 of the steering: the steering itself will provide for handlebars shown diagramatically at 16 and a known suspension arrangement for a wheel 15. The central part 11, with overlay 25 made of a suitable material, represents the footrest which is sufficiently wide and, by virtue of the possible architecture of the engine (as will be seen hereinafter) sufficiently low. The rear portion 12, overlaid with the aforesaid element 25 or other equivalent separate member, is used as luggage carrier. The area can be limited forwardly by the protusion 32, fixed, removable or tippable, and provided with a series of lateral hooks 33 adapted to anchor pass-through members 34 for securing the luggage.

Proximally to the terminal area of the slanted part 12 it is possible to fix supports 21 for the saddle 22, such supports advantageously having the form of tubular elements secured to the frame by bolting, welding or sundry articulations if it is wished that they be foldable. The two supports 21 can also form rear luggage-containment elements, when the luggage is voluminous as in the case of the portion 12 the rear mudguard 23 can with advantage be secured in overhung manner.

To the portion 11 of the frame there is secured an articulation 17 of a motor-rearwheel assembly shown diagrammatically and indicated overall by 18. In particular, the engine cylinder is indicated by 27, the wheel by 29 and the pedals by 30; the numeral 31 indicates the longitudinal arm of the assembly accepting the pedal-wheel and the engine-wheel trasmissions. The configuration of the frame is such that it can typically accept a rear wheel that is not excessively large, in particular of diameter midway between that of the scooter wheels and that of high-wheel moped wheels (for example 14"). The embodiment of the suspension of the frame can be of different configurations; the drawings exemplify an embodiment with a central elestic member 19 or with two lateral elstic members 20.

The frame as illustrated can to advantage be made of sheet or plate material, in particular with two half-shells welded laterally at 24, and can have in its upper portion the previously mentioned overlay 25. In this general configuration of the frame, provision can be made for its lower part to be more or less displaced with respect to the flat configuration so as to have hollow portions that do not involve the sides of the frame and thus only partially reduce its strenght and rigidity.

FIG. 4 shows how a hollow 26 can be formed in the portion 12 of the frame to accept the bulk of the engine 27 forming part of the assembly 18.

The power pack positioning shown in the drawings, which uses the space created by the slant of the rear section of the frame and by the hollow formed in the lower face, is the key-element for satisfying the criteria of characteristics as set out earlier herein inasmuch as below the horizontal section of the frame there remains, practically in isolation, the bulk of the pedal system, which can thus assume its most suitable position both lenghtwise and heighwise; in addition, the horizontal section of the frame can be of the pre-set height (35÷37 cm. off the ground).

The engine-rearwheel architecture as described is not the only one compatible with the proposed frame; however, it is probably the one that avoids compromise with regard to the desired characteristics.

If the moped has a fold-up configuration which in its folded position provides for the front wheel 15 being moved towards the centre of vehicle (as proposed in the co-pending Italian patent application of the same Applicant), the frame can be provided in its lower portion with a seating 28 for accepting the wheel.

As a result of its box-configuration, the frame 10 can constitute a fuel-tank.

The fuel-tank cap 35 will be disposed proximally to the higher end of the slanted portion 12.

I claim:

1. A moped comprising a beam-type frame having a substantially horizontal central portion, to one end of which there is connected a hub support that carries the articulation of the front-wheel fork, and the other end of which extends rearwardly and diagonally upwardly at an angle of less than 45° to the horizontal thereby to form an inclined rear portion carrying at its upper end support elements for a saddle and a rear mudgard, the central portion having a generally flat upper surface adapted, as a result of its width and length, to constitute a footrest, and said inclined rear portion also having a generally flat upper surface approximately equal in size to that of said central portion, whereby as a result of its dimensions and inclination at an angle of less than 45°, said inclined portion is adapted selectively to constitute either a luggage carrier or a second footrest.

2. A moped as described in claim 1, wherein the said frame has a generally box-like configuration of rectangular cross section with the larger side horizontal.

3. A moped as described in claim 1, wherein the upper side of the frame, proximally to the horizontal and inclined rear portion, thereof has a mat-like covering on which to rest feet and luggage.

4. A moped as described in claim 1, wherein the upper side of the frame, proximally to the rear slanted portion thereof, is equipped with means for releasably securing luggage thereon.

5. A moped as described in claim 2, wherein the lower side of the box-like frame has inwardly facing recesses for accepting protruding parts of adjacent elements of the moped.

6. A moped as described in claim 2, wherein the frame consists of two shells welded in the vicinity of the lateral side walls of the frame.

7. A moped as described in claim 2, wherein a portion of said box-like frame constitutes the fuel-tank.

* * * * *